Mar. 20, 1923.
F. J. WESTENDORF
LOADER
Filed July 15, 1921
1,449,359
3 sheets-sheet 1
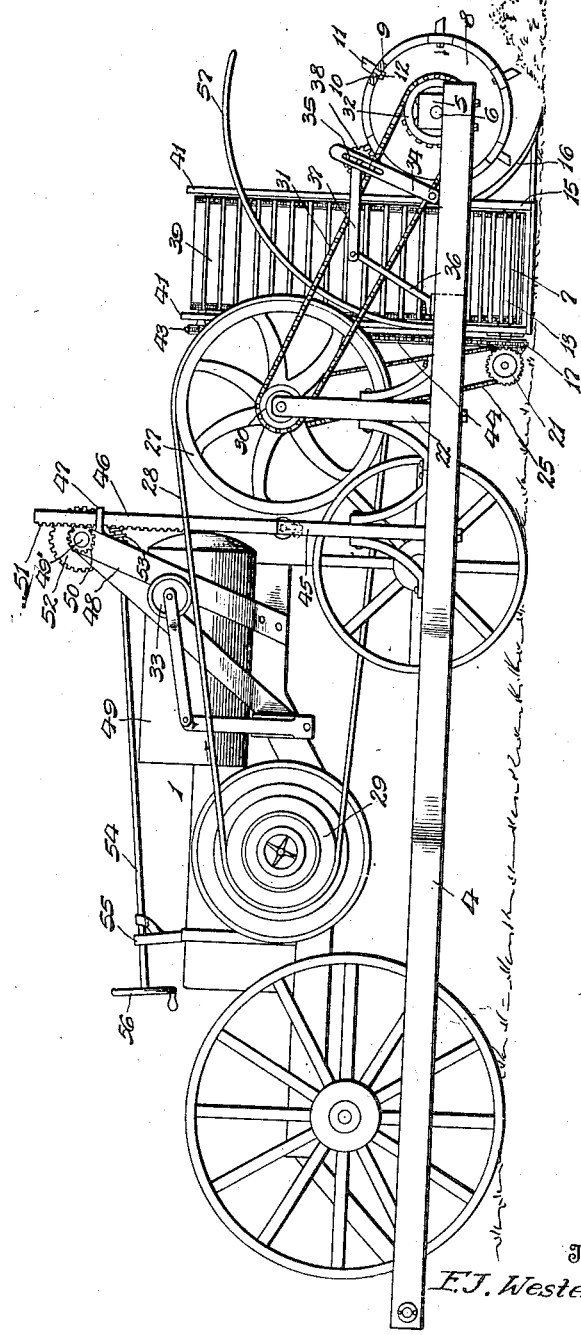
Inventor
F. J. Westendorf.
By
Lacey & Lacey, Attorneys

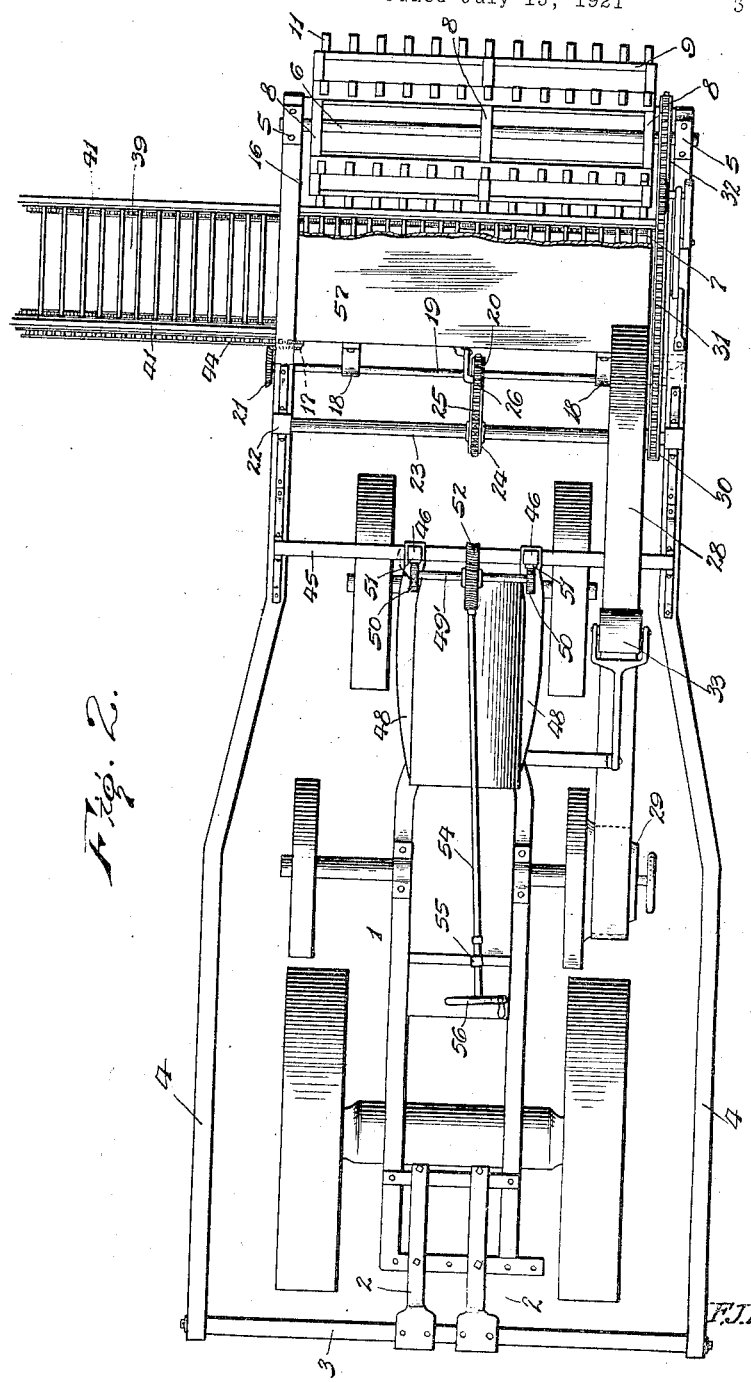

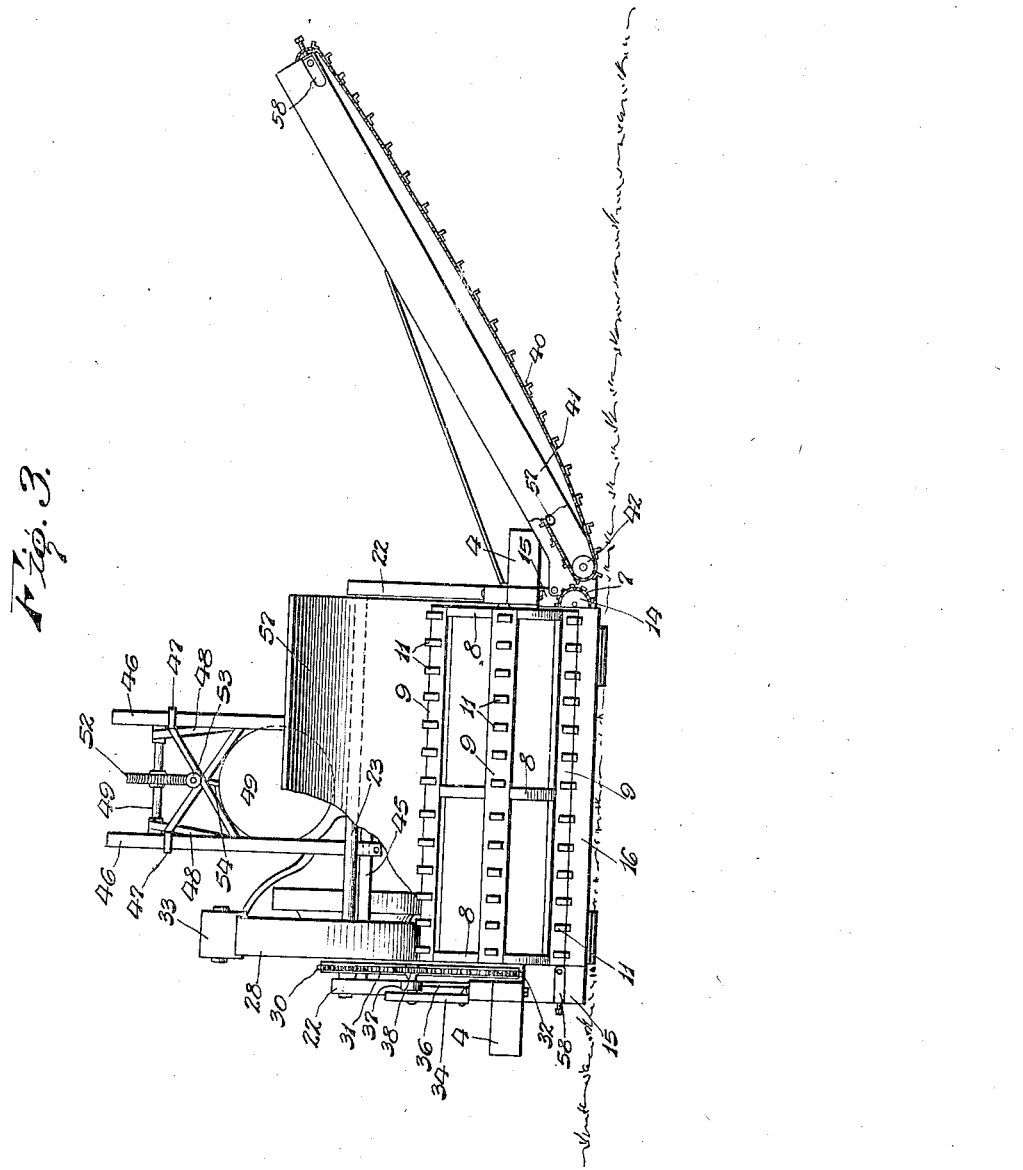

Patented Mar. 20, 1923.

1,449,359

UNITED STATES PATENT OFFICE.

FREDERICK J. WESTENDORF, OF HAMMOND, MINNESOTA.

LOADER.

Application filed July 15, 1921. Serial No. 484,977.

*To all whom it may concern:*

Be it known that I, FREDERICK J. WESTENDORF, a citizen of the United States, residing at Hammond, in the county of Wabasha and State of Minnesota, have invented certain new and useful Improvements in Loaders, of which the following is a specification.

This invention relates to loaders and has for its object the provision of a portable machine which may be driven to a pile of material and operated to transfer the material from the pile to a wagon or other vehicle for transportation to a point of use. The invention seeks to provide an apparatus for the stated purpose which may be mounted upon and driven by a tractor and which will act upon successive portions of the pile of material and deliver the same onto a conveyer whence it will be transferred to the vehicle. Secondary objects of the invention are to provide means whereby the elevator which delivers the material into the wagon may be disposed at either side of the apparatus; to provide means to prevent portions of the material dropping in front of the conveyer and being lost, and to provide means whereby the material will be prevented from being thrown upon the tractor or any of the operating mechanism or upon the person of the driver. Other objects of the invention will appear incidentally in the course of the following description.

In the accompanying drawings which illustrate one embodiment of the invention,—

Figure 1 is a side elevation of a tractor and my improved loader connected therewith;

Fig. 2 is a plan view of the same partly broken away, and

Fig. 3 is a front end elevation partly broken away.

Fig. 4 is a detail perspective of a loading blade.

The tractor, indicated at 1, may be of any well-known or preferred type. In applying my invention to the tractor, I secure rigidly to the draft couplings 2 of the tractor a transverse beam 3 which projects beyond the sides of the tractor, as clearly shown in Fig. 2. Connected with the ends of this transverse beam 3 for pivotal movement in vertical planes are side bars 4 which extend forwardly at the sides of the tractor and project beyond the front end thereof. Upon the extreme front ends of the side bars 4, I provide bearings 5 in which is journaled a transverse shaft 6 which carries a feeding or loading cylinder adapted to act upon the material and feed the same onto a conveyer 7 mounted transversely upon the frame in rear of the cylinder. The feeding cylinder or beater comprises discs 8 secured to the shaft 6 at the center thereof and near the ends thereof, and cross bars 9 secured rigidly to said discs. The bars 9 are provided at intervals from end to end with openings adapted to receive the reduced ends or stems 10 of the teeth 11 which project radially from the bars. Securing nuts 12 are mounted on the inner ends of the stems 10 and are turned home against the cross bars 9 to draw the shoulders presented by the inner ends of the teeth firmly against the outer sides of the cross bars whereby the teeth will be securely clamped in place. When the machine is to act upon strawy or stringy material, such as barnyard fertilizer, the teeth 11 are employed, but when it is to act upon sand or other granular material, the teeth 11 are withdrawn and blades or shovels 12' are substituted therefor, the said blades being substantially laterally extended teeth provided with a plurality of stems which are engaged in the openings of the cross bars and secured therein in the same manner as the teeth 11 are secured. These blades or shovels 12' will obviously act upon a wider extent of the pile of material than the teeth and will sweep the same onto the conveyer 7.

The conveyer 7 comprises an endless belt equipped with cross bars 13 and supported by sprocket wheels or rollers 14 mounted in a supplemental frame 15 depending from the side bars 4. The supplemental frame is disposed in rear of the feeding drum or cylinder and to the front side of the frame 15 a guiding plate 16 is secured and extends downwardly and forwardly therefrom under the feeding cylinder, as shown most clearly in Fig. 1. This guiding plate is preferably so disposed that its front edge will run upon the ground and it, therefore, acts as a scraper or shovel to take up some of the material to be loaded and thereby cooperates with the feeding cylinder to accelerate the transfer of the material. The shafts of the rollers 14 which support the conveyer 7 are extended rearwardly through the rear side of the frame 15 and are equipped with combined beveled gears and sprocket wheels 17. Journaled in brackets 18 extending rearwardly from the rear side of the supplemental frame 15 is a countershaft 19 which is equipped at its center with a sprocket wheel 20 and at its ends with beveled pinions 21 which mesh with the respectively adjacent combined beveled pinion and sprocket wheel 17. In rear of the countershaft 19, standards 22 are secured upon the side bars 4 and in the upper ends of these standards is journaled a driving shaft 23 equipped at its center with a sprocket wheel 24 around which and the sprocket 20 is trained a chain 25. A chain tightener 26 is carried by the frame 15 and engages the sprocket chain 25 so as to compensate for wear of the same and maintain its taut condition. Upon the shaft 23 is also secured a driving pulley 27 which is connected by a belt 28 with the driving pulley 29 of the tractor so that the power of the tractor engine may be transmitted to the shaft 23 to rotate the same. Upon one end of the shaft 23 is also secured a sprocket pinion 30 and a sprocket chain 31 is trained around the said sprocket pinion and around a sprocket gear 32 secured on the end of the shaft 6 whereby to rotate the feeding cylinder, the gears 24 and 20 and the chain 25 obviously serving to rotate the countershaft 19 from which motion is transmitted to the conveyer 7. A belt tightener 33 is mounted in any convenient manner upon the tractor and bears upon the belt 28 so as to maintain the taut condition of the same at all times, and upon the forward portion of the side bar 4 adjacent the chain 31, I pivotally mount a post 34, having a longitudinal slot 35, and a post 36 to the upper end of which is pivoted a lever 37. An idler sprocket 38 is carried by the front end of the lever 37 and the axle of said sprocket plays in the slot 35 of the post 34 so that it will be guided and held to the chain 31 to keep the same in operative engagement with the sprockets 30 and 32.

The endless belt elevator 39 extends laterally from the apparatus in alinement with the conveyer 7 and this elevator consists of an endless apron of any suitable material having slats or bars 40 secured transversely thereon. The apron is disposed between side bars 41 and carried by rollers 42 at the upper and lower ends of said side bars. The side bars 41 may be attached to either end of the supplemental frame 15 so that the machine may be arranged to deliver material into a wagon at either side as may be preferred and the shaft of the upper roller 42 is extended through one side bar 41 and equipped with a sprocket 43 around which is trained a sprocket chain 44, said chain being also trained around the sprocket member of the adjacent combined sprocket and beveled gear 17. This arrangement causes the power to actuate the elevator to be applied at the upper end of the same so that the upper run of the elevator will be positively pulled and the load, therefore, easily carried. It will also be noted that the described arrangement drives the transverse conveyer and the elevator from the same shaft.

In rear of the posts or standards 22, I secure upon the side bars 4 an arched lifting frame 45, the cross bar of which is hingedly engaged in the lower ends of lifting bars 46, the said lifting bars 46 being loosely engaged in eyes or stirrups 47 on the upper ends of supporting arms 48 which are secured to the tractor frame and rise therefrom around the tank 49 thereon. In the upper ends of the supporting arms 48 is journaled a shaft 49' equipped at its ends with pinions 50 meshing with racks 51 upon the rear sides of the lifting bars 46. At the center of the shaft 49' is a worm gear 52 which meshes with a worm 53 on the front end of an adjusting rod 54 which extends rearwardly and is supported in a suitable bracket 55 upon the tractor and equipped at its rear end with a hand wheel 56. It will be readily understood that by suitably rotating the adjusting rod or shaft 54 motion will be imparted to the shaft 49' and the pinions 50 caused to act upon the lifting bars through the racks 51 to raise or lower said bars and thereby swing the side bars 4 pivotally upon the transverse beam 3 and set the feeding cylinder and the other working parts to act upon the top of the pile of material and assume lower positions as the pile of material decreases.

A fender 57 is provided, the said fender consisting of an imperforate plate secured at one edge to the rear side of the supplemental frame 15 and extending in a curved form upwardly and forwardly over the conveyer and the feeding cylinder. Any material which may be thrown violently from the plate 16 by the feeding cylinder will be arrested by this fender and, consequently, will be prevented from flying back upon the driving gearing or upon any of the working parts of the tractor or the person of the driver and will be caused to drop onto the conveyer 7 and delivered by the same onto the elevator.

The upper runs of the conveyer and the elevator may be supported by transverse rollers, as indicated at 57, and the main supporting and driving rollers will preferably have their bearings slidably mounted, as indicated at 58, to permit the aprons to be tightened.

In operation, the apparatus is driven up to the pile of material which is to be transferred to a wagon or other vehicle and the tractor engine adjusted to rotate the pulley 29. The motion of this pulley 29 will be transmitted through the described trains of gearing to rotate the feeding cylinder in the direction indicated by the arrow in Fig. 1, and the cylinder will consequently carry its teeth or blades successively against the pile of material and throw portions of the same onto the guiding scraper 16. The continued movement of the blades or teeth will obviously force the material upwardly over this guiding scraper and deliver it onto the conveyer 7 which in turn will deposit it upon the elevator 19 for delivery into the vehicle.

My apparatus is obviously simple in construction and compact in arrangement and will be found efficient in operation. It may be operated economically to very expeditiously and easily transfer a load of stored material onto a wagon or truck for transportation to a point of use and when it is not in use and it is desired to employ the tractor for other purposes, it may be readily removed without necessitating any change in construction or re-arrangement of the parts of the tractor.

Having thus described the invention, what is claimed as new is:

1. A loading machine comprising a cross beam to be secured to a tractor, a pair of side bars pivoted on the ends of said cross beam to extend longitudinally beyond the front end of the tractor, a feeding cylinder mounted on and between the front ends of said side bars, a transverse conveyer carried by the side bars in rear of the feeding cylinder, means mounted on the side bars whereby the feeding cylinder and the conveyer may be driven by the tractor, a lifting frame on the side bars, and means to be mounted on the tractor and co-operate with the lifting frame to raise or lower the side bars.

2. In a loading machine, the combination of a frame including pivotally mounted side bars, means carried by the front ends of said side bars for feeding material from a pile and delivering it into a receptacle at the side of the frame, a transverse connection between the side bars in rear of said feeding and delivering means, lifting bars rising from said connection, racks on said lifting bars, a transverse shaft arranged in rear of said lifting bars, pinions on said shaft meshing with said racks, and means for rotating said shaft.

In testimony whereof I affix my signature.

FREDERICK J. WESTENDORF. [L. S.]